(12) United States Patent
Murakami

(10) Patent No.: US 10,940,878 B2
(45) Date of Patent: Mar. 9, 2021

(54) ARTICLE TRANSPORT FACILITY

(71) Applicant: Daifuku Co., Ltd., Osaka (JP)

(72) Inventor: Ryuya Murakami, Hinocho (JP)

(73) Assignee: Daifuku Co., Ltd., Osaka (JP)

(*) Notice: Subject to any disclaimer, the term of this patent is extended or adjusted under 35 U.S.C. 154(b) by 481 days.

(21) Appl. No.: 15/951,374

(22) Filed: Apr. 12, 2018

(65) Prior Publication Data

US 2018/0297620 A1 Oct. 18, 2018

(30) Foreign Application Priority Data

Apr. 14, 2017 (JP) .............................. JP2017-080694

(51) Int. Cl.
| | | |
|---|---|---|
| *B61L 23/04* | (2006.01) | |
| *B61B 3/02* | (2006.01) | |
| *B65G 47/61* | (2006.01) | |
| *B61B 10/02* | (2006.01) | |
| *B65G 35/06* | (2006.01) | |
| *B65G 37/02* | (2006.01) | |

(52) U.S. Cl.
CPC .............. *B61L 23/041* (2013.01); *B61B 3/02* (2013.01); *B61B 10/02* (2013.01); *B65G 35/06* (2013.01); *B65G 47/61* (2013.01); *B65G 37/02* (2013.01); *B65G 2203/0291* (2013.01); *B65G 2203/042* (2013.01)

(58) Field of Classification Search
CPC ........ B61L 23/041; B61L 5/189; B61L 5/206; B61B 3/02; B61B 10/02; B65G 35/06; B65G 47/61; B65G 43/02
See application file for complete search history.

(56) References Cited

U.S. PATENT DOCUMENTS

| | | | | |
|---|---|---|---|---|
| 9,758,308 | B1* | 9/2017 | Nishikawa | ........ H01L 21/67294 |
| 10,083,847 | B2* | 9/2018 | Tomida | ............. H01L 21/67733 |
| 2004/0118980 | A1* | 6/2004 | Chang | ............... H01L 21/67736 |
| | | | | 246/1 C |
| 2006/0177291 | A1* | 8/2006 | Kienzl | ............... G06K 7/10079 |
| | | | | 414/331.15 |
| 2011/0262004 | A1* | 10/2011 | Murakami | ............. B66C 13/48 |
| | | | | 382/103 |
| 2017/0197794 | A1* | 7/2017 | Murao | .................... B65G 43/00 |
| 2018/0118239 | A1* | 5/2018 | Murakami | ............. B65G 43/02 |
| 2018/0297620 | A1* | 10/2018 | Murakami | ............. B65G 35/06 |
| 2018/0327009 | A1* | 11/2018 | Takagawa | ............. B65G 13/12 |

FOREIGN PATENT DOCUMENTS

| | | |
|---|---|---|
| JP | 2003233423 A | 8/2003 |
| JP | 2005206306 A | 8/2005 |
| JP | 2005266936 A | 9/2005 |

* cited by examiner

*Primary Examiner* — Jason C Smith
(74) *Attorney, Agent, or Firm* — The Webb Law Firm

(57) ABSTRACT

An article transport facility includes one or more rails which include one or more portions in which a travel path is curved, and an article transport vehicle configured to travel along the one or more rails to transport an article. The article transport vehicle includes a guided portion configured to be in contact with the one or more rails to be guided thereby, an obstacle detection sensor configured to detect an obstacle in a detection area which is set to be located ahead of the article transport vehicle, and a setting portion configured to changeably set the detection area. The setting portion is configured to change the detection area depending on an in-contact-rail shape which is a shape of one or more portions of the one or more rails that the guided portion is in contact with.

20 Claims, 13 Drawing Sheets

ARTICLE TRANSPORT FACILITY

CROSS-REFERENCE TO RELATED APPLICATION

This application claims priority to Japanese Patent Application No. 2017-080694 filed Apr. 14, 2017, the disclosure of which is hereby incorporated in its entirety by reference.

FIELD OF THE INVENTION

The present invention relates to an article transport facility comprising one or more rails which include one or more portions in which a travel path is curved, and an article transport vehicle configured to travel along the one or more rails to transport an article.

BACKGROUND ART

The article transport facility described in JP Publication of Application No. 2005-266936 includes an obstacle sensor provided at a forward end portion of each article transport vehicle. This obstacle sensor detects any obstacles that may exist in a detection area set ahead of the obstacle sensor. When an obstacle is detected by the obstacle detection sensor, the article transport vehicle performs an emergency stop to prevent the transport vehicle from coming into contact with the obstacle.

SUMMARY OF THE INVENTION

In the article transport facility described above, when a transport vehicle travels in a curved portion of a travel path, the detection area of the obstacle detection sensor is shifted off (along a path width direction) the travel path to a significant degree. This causes the obstacle sensor to detect, as an obstacle, any installed object which exists in a location in which the transport vehicle would not come into contact with the object, which, in turn, causes the article transport vehicle to perform an emergency stop before entering, or within, the curved portion. To prevent this from occurring, it is conceivable to attach non-reflective sheets, etc., to any objects installed around a curved portion so that the obstacle sensor would not detect them as obstacles, which would allow the article transport vehicle to travel in the curved portion of the travel path. This leads to a problem that this increases the amount of work required to install the article transport facility.

Thus, an article transport facility is desired in which a transport vehicle can properly travel in a curved portion of a travel path while reducing any increase in the amount of work required to install the article transport facility.

In light of the above, an article transport facility comprises: one or more rails which include one or more portions in which a travel path is curved; and an article transport vehicle configured to travel along the one or more rails to transport an article; wherein the article transport vehicle includes a guided portion configured to be in contact with the one or more rails to be guided thereby, an obstacle detection sensor configured to detect an obstacle in an detection area which is set to be located ahead of the article transport vehicle, and a setting portion configured to changeably set the detection area, and wherein the setting portion is configured to change the detection area depending on an in-contact-rail shape which is a shape of one or more portions of the one or more rails that the guided portion is in contact with.

With the arrangement described above, the detection area of the obstacle detection sensor is changed by the setting portion depending on to the in-contact-rail shape which the guided portion of the article transport vehicle is in contact with. In other words, although the orientation of the article transport vehicle may change because of the in-contact-rail shape which the guided portion of the article transport vehicle is in contact with, the detection area can be changed to have a shape that is appropriate for the orientation of the article transport vehicle, by changing the detection area depending on the in-contact-rail shape. This makes it possible to set the detection area of the obstacle detection sensor so that the detection area would not be shifted off the travel path along the path width direction. This arrangement makes it possible to reduce the likelihood of erroneously detecting any object outside the travel path as an obstacle. Therefore, there is no need to attach low-or-non-reflective sheet on any installed object, reducing the amount of work necessary to install the article transport facility.

DETAILED DESCRIPTION OF EMBODIMENTS

Figure 1:
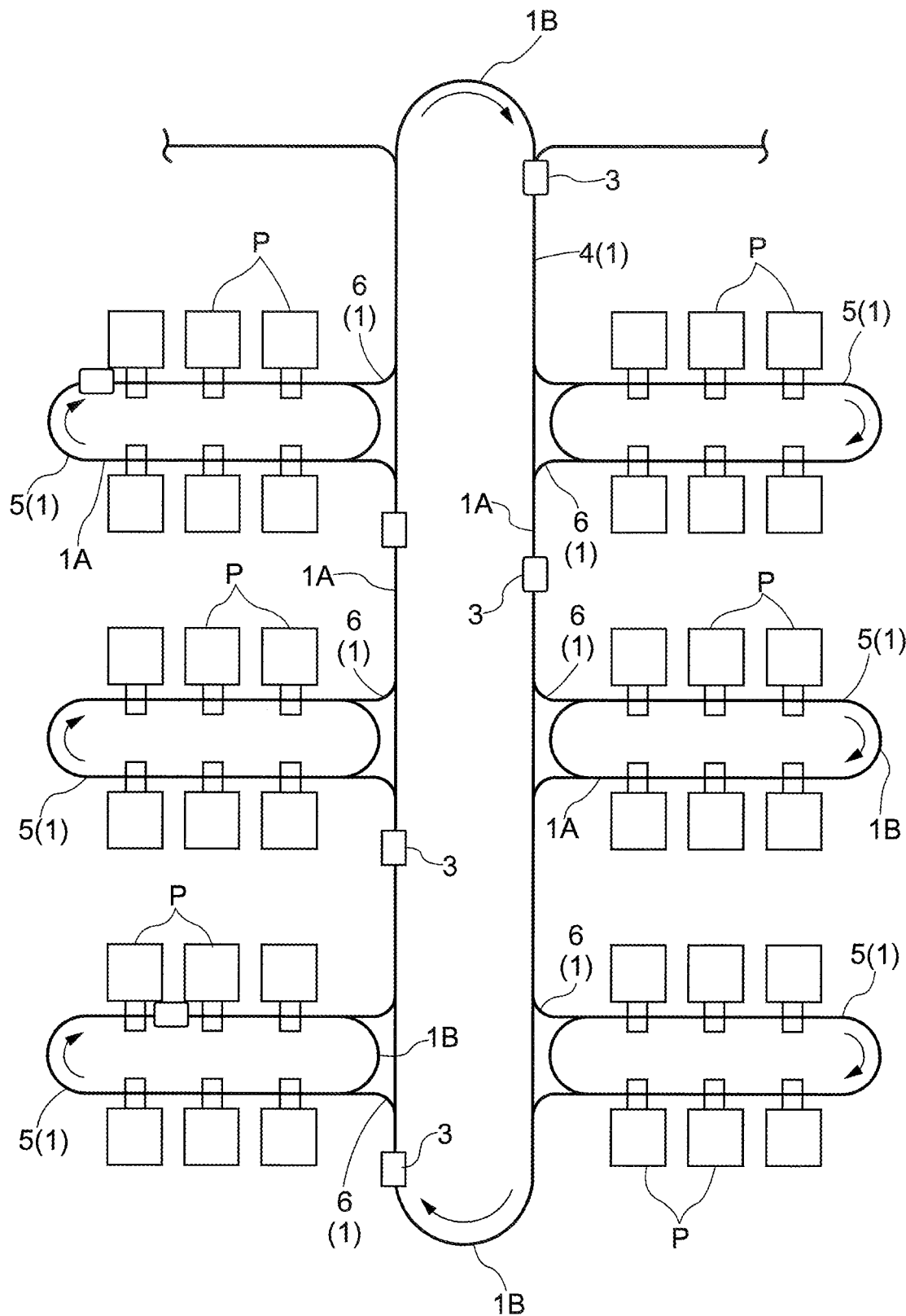
FIG. 1 is a plan view of an article transport facility.
Figure 2:
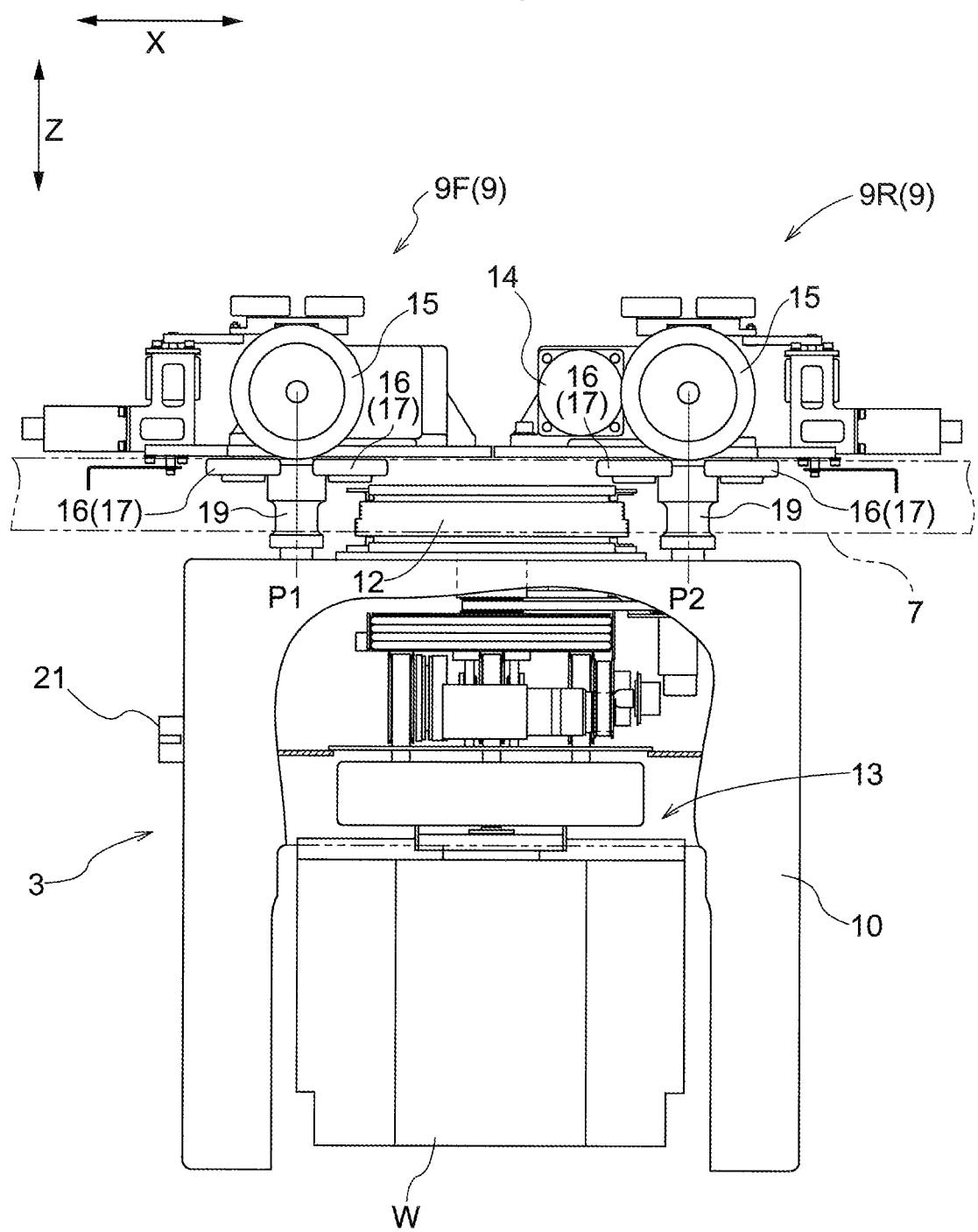
FIG. 2 is a side view of an article transport vehicle.
Figure 3:
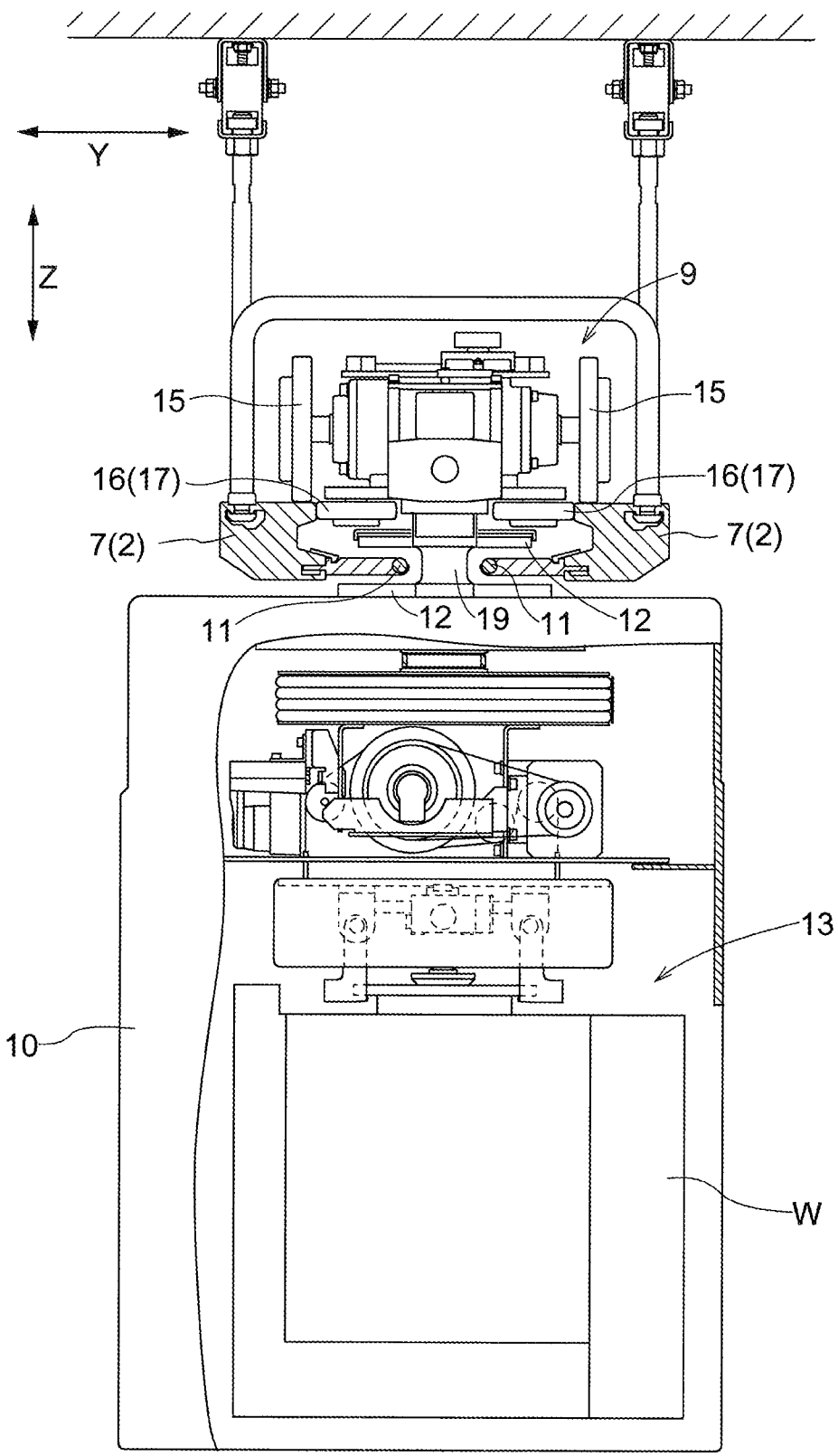
FIG. 3 is a partially cut-away front view of the article transport vehicle.

Embodiments of an article transport facility are described with reference to the attached drawings. As shown in FIGS. 1 to 3, an article transport facility includes travel rails 2 as rails installed along each travel path 1, and article transport vehicles 3 each of which is configured to travel on the travel rails 2 and along the travel path 1 to transport an article W. Note that, in the present embodiment, each article transport vehicle 3 transports, as an article W, a FOUP (Front Opening Unified Pod) for holding one or more semiconductor substrates.

As shown in FIG. 2, the travel paths 1 include one closed-loop primary path 4, closed-loop secondary paths 5, each of which extends by way of a plurality of article processors P, and connecting paths 6 each of which connects the primary path 4 to a secondary path 5 or vice versa. Note that, when a path is described to extend "by way of" processors P, it means that the path extends sufficiently close to each of the processors P (or transfer locations therefor) to allow a transport vehicle 3 to transfer an article for processing by one or more of the processors P. The travel paths 1 include a plurality of secondary paths 5. Each article transport vehicle 3 travels in the same circumferential direction (in the clockwise direction in the present embodiment) when traveling along the primary path 4 or any of the plurality of secondary paths 5. Note that, in FIG. 1, the travel directions of the article transport vehicles 3 are indicated by the arrows. The connecting paths 6 include branching connecting paths 6 each of which is capable of allowing the article transport vehicles 3 to travel (or perform a "branching travel") from the primary path 4 toward a secondary path 5, and merging connecting paths 6 each of which is capable of allowing the article transport vehicles 3 to travel (or perform a "merging travel") from a secondary path 5 toward the primary path 4.

Each travel path 1 includes linear path portions 1A each of which is linear in shape, and curved path portions 1B each of which is curved. More specifically, the primary path 4 includes a pair of parallel linear path portions 1A, and a pair of curved path portions 1B each of which connects end portions of the pair of linear path portions 1A to each other. As with the primary path 4, each of the plurality of secondary paths 5 includes a pair of parallel linear path portions 1A, and a pair of curved path portions 1B. Each connecting path 6 includes a curved path portion 1B connected to the primary path 4, and a linear path portion 1A connected to a secondary path 5. As such, the travel paths 1 are formed by a combination of linear path portions 1A and curved path portions 1B.

As shown in FIGS. 2 and 3, the travel rails 2 consist of a pair of right and left rails 7. In addition, as shown in FIGS. 5 to 13, the travel rails 2 include linear rail portions 2A located in and along a linear path portion 1A, and curved rail portions 2B located in and along a curved path portion 1B. In other words, the travel path 1 is linear in its portion in which linear rail portions 2A are located whereas the travel path 1 is curved in its portion in which curved rail portions 2B are located. As such, the travel rails 2 include at least some portions in which the travel path is curved. In addition, the travel rails 2 include portions in which the travel path is linear.

An article transport vehicle 3 is described next. In the following description, the direction parallel (include tangential), to the travel path 1 will be referred to as the path longitudinal direction X whereas the direction perpendicular to the path longitudinal direction X as seen along the vertical direction Z will be referred to as the path width direction Y. In addition, with respect to a travel path 1, the travel direction of the article transport vehicle 3, (direction in which the article transport vehicle 3 travels) will be referred to as the downstream side whereas the side opposite from the downstream side will be referred to as the upstream side. Note that, for example, when an article transport vehicle 3 is traveling along a linear portion of a travel path 1, the front and back direction of the article transport vehicle 3 coincides with the path longitudinal direction X of the travel path 1, and the right and left direction of the article transport vehicle 3 coincides with the path width direction Y of the travel path 1. The path width direction Y corresponds to the lateral width direction which intersects the travel path 1 in question.

As shown in FIGS. 2 and 3, each article transport vehicle 3 includes travel portions 9 configured to travel on and along the travel rails 2 which are suspended from and supported by the ceiling, a main body portion 10 located below the travel rails 2 and suspended and supported by the travel portions 9, and power-receiving portions 12 configured to receive driving electric power, without contact, from electricity supply lines 11 provided to extend along the travel path 1. The main body portion 10 is provided with a support mechanism 13 which can be vertically moved with respect to the main body portion 10 and which is configured to support an article W with the article W suspended from the support mechanism 13.

The travel portions 9 include a first travel portion 9F and a second travel portion 9R located next to each other along the front and back direction of the article transport vehicle 3. The first travel portion 9F includes an electric-powered drive motor 14, and a pair of right and left travel wheels 15 driven and rotated by this drive motor 14. This pair of right and left travel wheels 15 are provided to the first travel portion 9F so as to roll on the top surfaces of the travel rails 2 (pair of right and left rail members 7). In addition, the first travel portion 9F also includes pairs of right and left guide wheels 16 each of which can rotate freely about a vertical axis extending along the vertical direction Z. Each pair of right and left guide wheels 16 is provided to the first travel portion 9F so as to be located between the pair of right and left rails 7 and such that each of the right and left guide wheels of the pair contacts and rolls on the corresponding one of the side surfaces (of the right and left rails 7) that face each other. Note that the first travel portion 9F is provided with two pairs of right and left guide wheels 16 with one pair located behind the other along the front and back direction. As with the first travel portion 9F, the second travel portion 9R is provided with one pair of right and left travel wheels 15 and two pairs of right and left guide wheels 16. And the two pairs of right and left guide wheels 16 provided to the first travel portion 9F and the two pairs of right and left guide wheels 16 to the second travel portion 9R form the guided portion 17 which is configured to be in contact with the travel rails 2 to be guided thereby, in the present embodiment. The guided portion 17 is in contact with the travel rails 2 in at least two locations that are spaced apart along the path longitudinal direction X (direction along the travel path 1).

Each of the first travel portion 9F and the second travel portion 9R includes a connecting shaft 19 which projects downward with respect to the lower edges of its travel wheels 15. The connecting shaft 19 of the first travel portion 9F and the main body portion 10 are connected to each other for relative rotation about a first vertical axis P1 which extends along the vertical direction Z. The connecting shaft 19 of the second travel portion 9R and the main body portion 10 are connected to each other for relative rotation about a second vertical axis P2 which extends along the vertical direction Z. When the article transport vehicle 3 is traveling straight ahead, the first vertical axis P1 is located at the same location as the rotation axis of the travel wheels 15 provided to the first travel portion 9F along the front and back direction of the article transport vehicle 3 (path longitudinal direction X), and at the midpoint (along the front and back direction) between the rotation axes of the two guide wheels 16 that are provided to the first travel portion 9F and located one behind the other along the front and back direction. In addition, the second vertical axis P2 is located at the same location as the rotation axis of the travel wheels 15 provided to the second travel portion 9R along the front and back direction of the article transport vehicle 3, and at the midpoint (along the front and back direction) between the rotation axes of two guide wheels 16 that are provided to the second travel portion 9R and located one behind the other along the front and back direction.

The article transport vehicle 3 travels along a travel path 1 with its position along the path width direction Y being restricted as a result of the fact that the guide wheels 16 of the first travel portion 9F and the second travel portion 9R are guided by the pair of travel rails 2, and as a result of the fact that the travel wheels 15 of the first travel portion 9F and/or the second travel portion 9R are driven and rotated by the drive motor 14. In addition, the article transport vehicle 3 is configured to be capable of traveling along the travel path 1 even in a curved path portion 1B as a result of the fact that the first travel portion 9F and the second travel portion 9R can pivot about respective vertical axes with respect to the main body portion 10.

Figure 4:
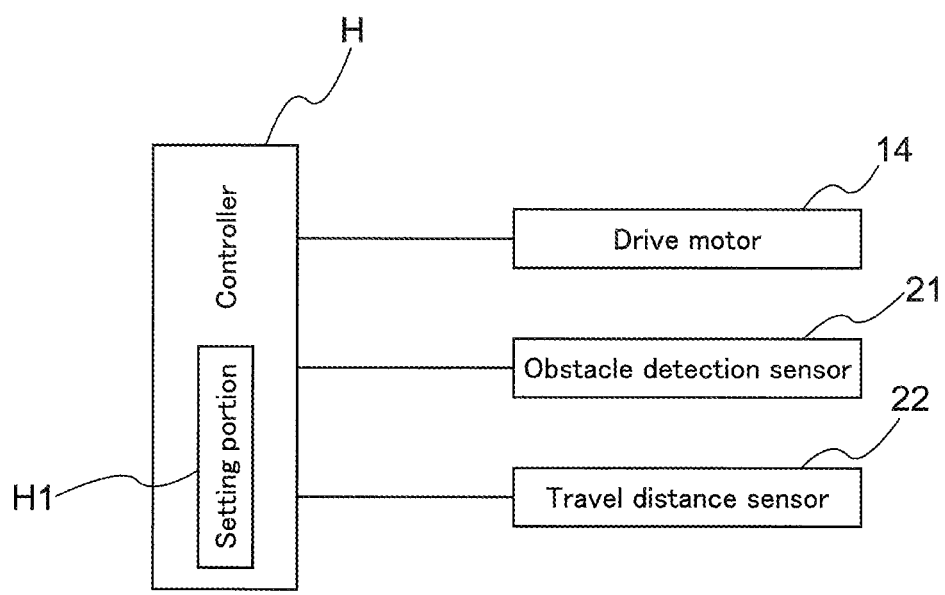
FIG. 4 is a control block diagram.

As shown in FIG. 4, the article transport vehicle 3 is provided with an obstacle detection sensor 21, a travel distance sensor 22, and a controller H. The obstacle detection sensor 21 may be a distance or range sensor using a laser radar or any other light or sound waves or pulses for detecting any obstacle which may exist in a detection area E set or defined ahead of the article transport vehicle 3. The travel distance sensor 22 may be a rotary encoder, among other possibilities of using one or more conventional sensors, for measuring the travel distance of the article transport vehicle 3 from one or more reference positions set along each travel path 1. The controller H determines the travel position or the current position of the article transport vehicle 3 based on the detected information or output from the travel distance sensor 22. In addition, the controller H stops the article transport vehicle 3 if it determines that an obstacle exists in the detection area E of the obstacle detection sensor 21 based on the detected information or output from the obstacle detection sensor 21.

The controller H controls one or both of the travel portions 9 of the article transport vehicle 3 such that the article transport vehicle 3 travels at a first speed if the article transport vehicle 3 is travelling along a linear path portion 1A and such that the article transport vehicle 3 travels at a second speed if the article transport vehicle 3 is travelling along a curved path portion 1B. Note that the first speed is set to be greater than the second speed. To describe this in more detail, as shown in FIGS. 7 to 11, with a first connection location 1C being a location at which a linear path portion 1A and a curved path portion 1B located downstream of this linear path portion 1A are connected to each other, a deceleration location is set at a set distance upstream from this first connection location 1C. In addition, with a second connection location 1D being a location at which a curved path portion 1B and a linear path portion 1A located downstream of this curved path portion 1B are connected to each other, an acceleration location is set at a location that corresponds to this second connection location 1D. And the controller H controls the travel portion 9 such that the article transport vehicle 3 travels at the first speed if the article transport vehicle 3 is traveling along a linear path portion 1A, and such that the article transport vehicle 3 decelerates to the second speed when the article transport vehicle 3 travels to and reaches the deceleration location in a linear path portion 1A. This causes the article transport vehicle 3 to enter the curved path portion 1B at the second speed. And the controller H controls the travel portion 9 such that the article transport vehicle 3 accelerates to the first speed when the article transport vehicle 3 leaves the curved path portion 1B (i.e., the article transport vehicle 3 travels to and reaches an acceleration location).

In addition, the controller H changes a detection area E depending on the travel speed of the article transport vehicle 3, an in-contact-rail shape, and a detection-area-rail shape. In other words, the controller H performs the function of the setting portion H1 configured to changeably set the detection area E of the obstacle detection sensor 21.

An in-contact-rail shape is the shape of the portions of the travel rails 2 that the guided portion 17 is in contact with. And the in-contact-rail shape is said to be a linear shape, or linear, if the in-contact-rail shape in each of a plurality of locations is linear. In addition, the in-contact-rail shape is said to be a curved shape, or curved, if the in-contact-rail shape of the portions in each of the plurality of locations is curved. In addition, the in-contact-rail shape is said to be a combination of a linear shape and a curved shape if the in-contact-rail shape of portions in each of one or more of the plurality of locations is linear, whereas the in-contact-rail shape of portions in each of the rest of the plurality of locations are curved.

To describe this in more detail, each wheel of the two pairs of guide wheels 16 of the first travel portion 9F and of the two pairs of guide wheels 16 of the second travel portion 9R is in contact with the corresponding one of the travel rails 2. However, in the present embodiment, the two pairs of guide wheels 16 of the first travel portion 9F is considered to form one group and the two pairs of guide wheels 16 of the second travel portion 9R is considered to form the other group. And the guided portion 17 is considered to contact the travel rails 2 in two (front and back) locations along the path longitudinal direction X. In other words, the portions of the guided portion 17 that are in contact with the travel rails 2 are defined based on the location of the first vertical axis P1 located at the center of the two pairs of guide wheels 16 of the first travel portion 9F as seen along a vertical direction Z, and the location of the second vertical axis P2 located at the center of the two pairs of guide wheels 16 of the second travel portion 9R as seen along a vertical direction Z. In short, the portions of the travel rails 2 in the same location, along the path longitudinal direction X, as the first vertical axis P1 as well as the portions of the travel rails 2 in the same location, along the path longitudinal direction X, as the second vertical axis P2 are the portions of the travel rails 2 that are in contact with the guided portion 17. Thus, if the first vertical axis P1 and the second vertical axis P2 are located in a linear path portion 1A along the path longitudinal direction X, the in-contact-rail shape is a linear shape, or linear. And if the first vertical axis P1 and the second vertical axis P2 are located in a curved path portion 1B along the path longitudinal direction X, the in-contact-rail shape is a curved shape, or curved. If one of the first vertical axis P1 and the second vertical axis P2 is located in a linear path portion 1A while the other of the first vertical axis P1 and the second vertical axis P2 is located in a curved path portion 1B, along the path longitudinal direction X, the in-contact-rail shape is a combination of a linear shape and a curved shape.

In addition, a detection-area-rail shape is the shape of the travel rails 2 in the detectable area of (i.e., an area in which an obstacle can be detected by) the obstacle detection sensor 21. And the travel rails 2 in the detectable area of the obstacle detection sensor 21 are portions of the travel rails 2 that are in the range from the upstream end of the detection area E to its downstream end along the path longitudinal direction X. In other words, if all portions of the travel rails 2 that are in the range from the upstream end of the set detection area E to its downstream end are linear, then the detection-area-rail shape is a linear shape, or linear. And if all portions of the travel rails 2 that are in the range from the upstream end of the set detection area E to its downstream end are curved, then the detection-area-rail shape is a curved shape, or curved. If a first connection location 1C or a second connection location 1D is located in the range from the upstream end of the set detection area E to its downstream end, then the detection-area-rail shape is a combination of a linear shape and a curved shape.

The shape (in-contact-rail shape) of the travel rails 2 in the location of the article transport vehicle 3 can be one of a linear shape (or linear), a curved shape (or curved), and a combination of a linear shape and a curved shape. The shape (detection-area-rail shape) of the travel rails 2 in the detectable area of the obstacle detection sensor 21 can be one of a linear shape (linear), a curved shape (curved), and a combination of a linear shape and a curved shape.

And a first shape E1, a second shape E2, a third shape E3, a fourth shape E4, a fifth shape E5, a sixth shape E6, and a seventh shape E7 are set or defined in advance as shapes of the detection area E of the obstacle detection sensor 21, depending on the travel speed of the article transport vehicle 3, the shape of the in-contact-rail shape, and the shape of detection-area-rail shape. And the information about the various shapes of the detection area E is stored in the controller H or the obstacle detection sensor 21. Each of the first shape E1, the second shape E2, the third shape E3, the fourth shape E4, the fifth shape E5, and the sixth shape E6, and the seventh shape E7 is different from another. In addition, each of these shapes is set or defined to be such a shape that the detection area E does not extend beyond the outside edge of either of the travel rails 2 forming a pair, along the path width direction Y.

Figure 5:
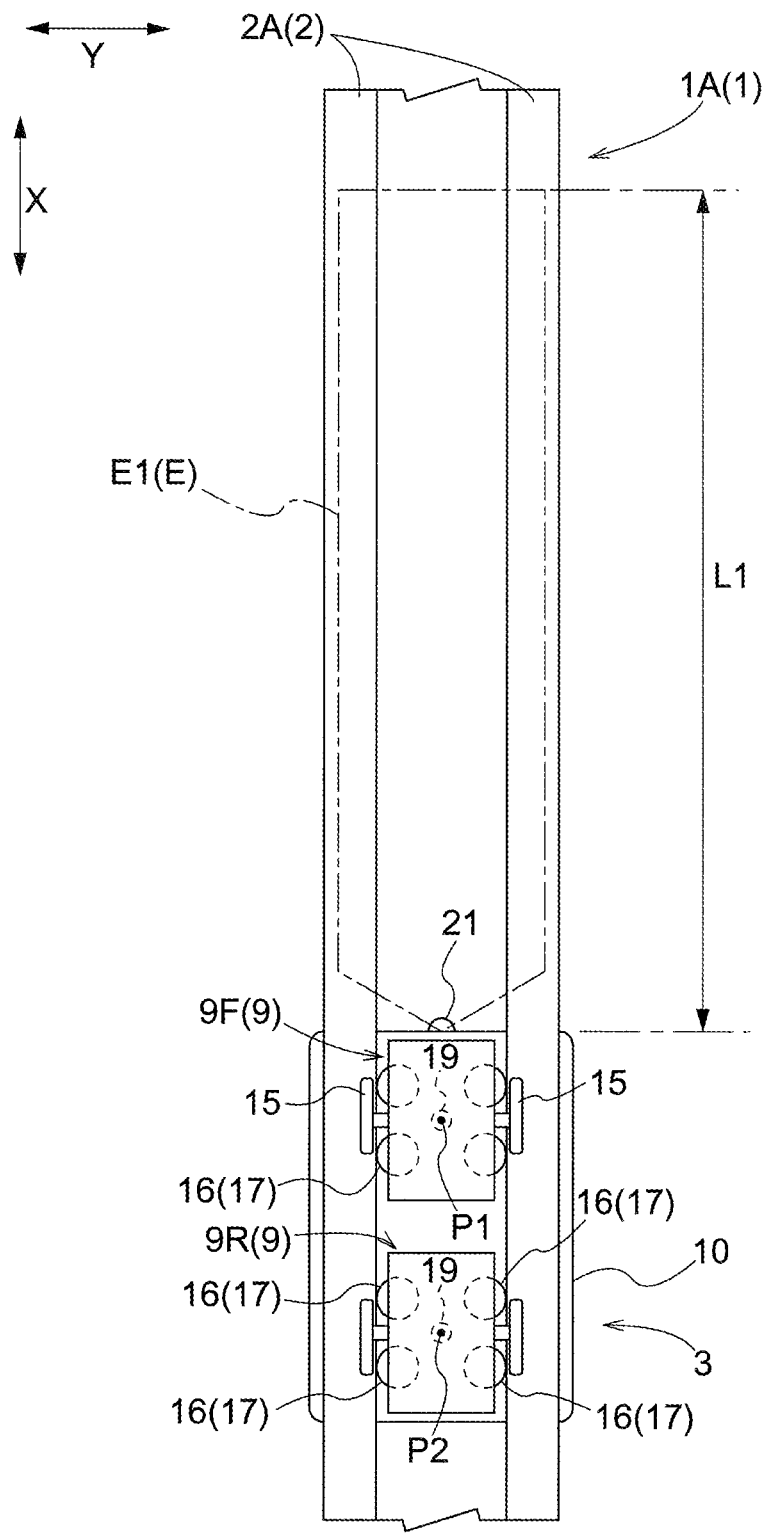
FIG. 5 shows a detection area having a first shape.
Figure 6:
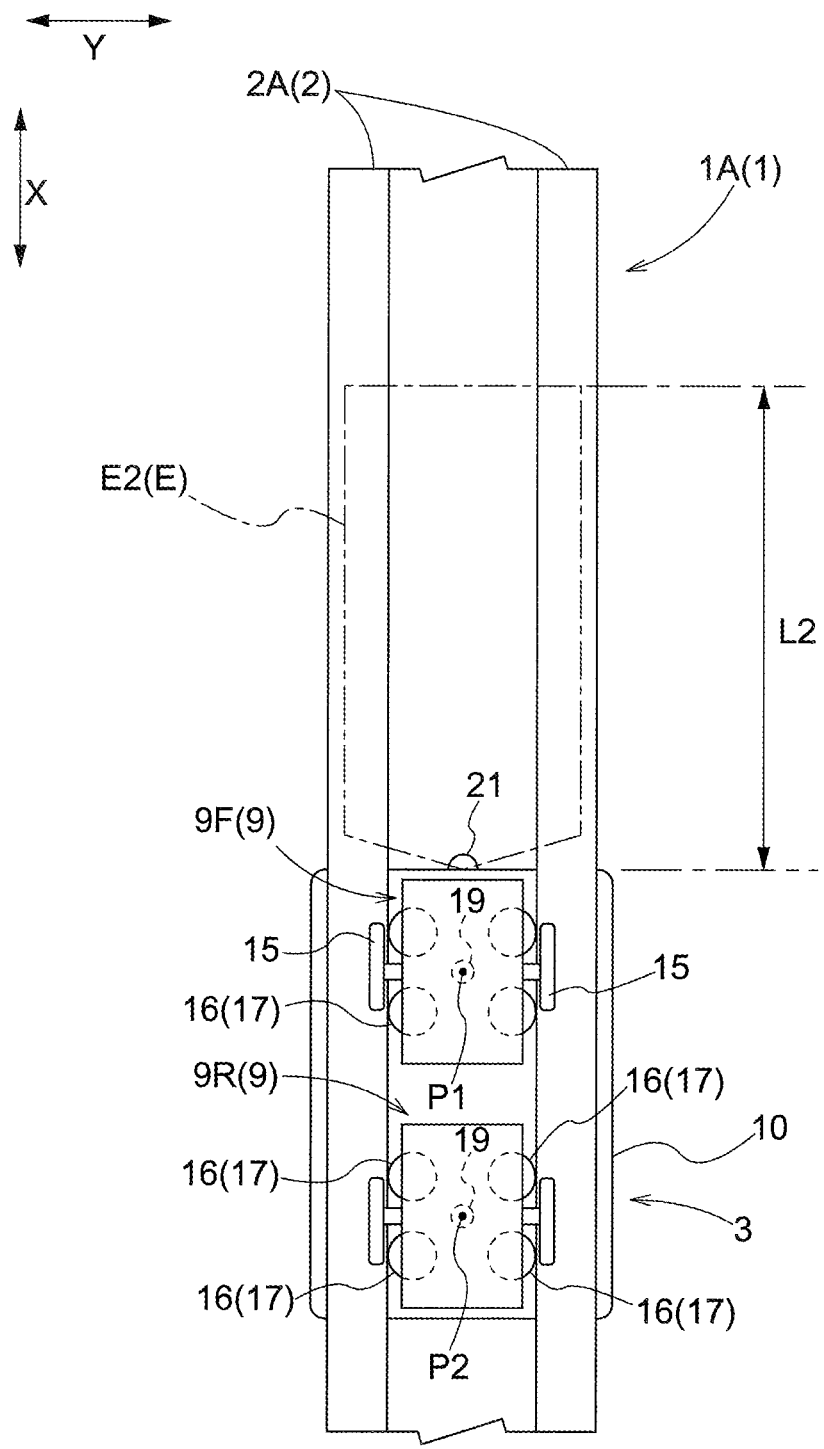
FIG. 6 shows a detection area having a second shape.

As shown in FIGS. 5 and 6, the controller H changes the shape of the detection area E to the first shape E1 or the second shape E2 if the in-contact-rail shape and the detection-area-rail shape are linear. More specifically, the controller H sets the shape of the detection area E to the first shape E1 as shown in FIG. 5 if the in-contact-rail shape and the detection-area-rail shape are linear and the article transport vehicle 3 is traveling at the first speed, is decelerating from the first speed to the second speed, or is accelerating from the second speed to the first speed. In addition, the shape of the detection area E is set to the second shape E2 as shown in FIG. 6 if the article transport vehicle 3 is traveling at the second speed. The length of the second shape E2 along the path longitudinal direction X is set to a second length L2 which is shorter than the first length L1 which is the length of the first shape E1 along the path longitudinal direction X. As this example illustrates, the controller H sets the detection area E depending on the travel speed of the article transport vehicle 3 such that the detection distance ahead of and from the article transport vehicle 3 is increased in a stepwise manner (two steps in the present embodiment) as the travel speed is increased.

Figure 7:
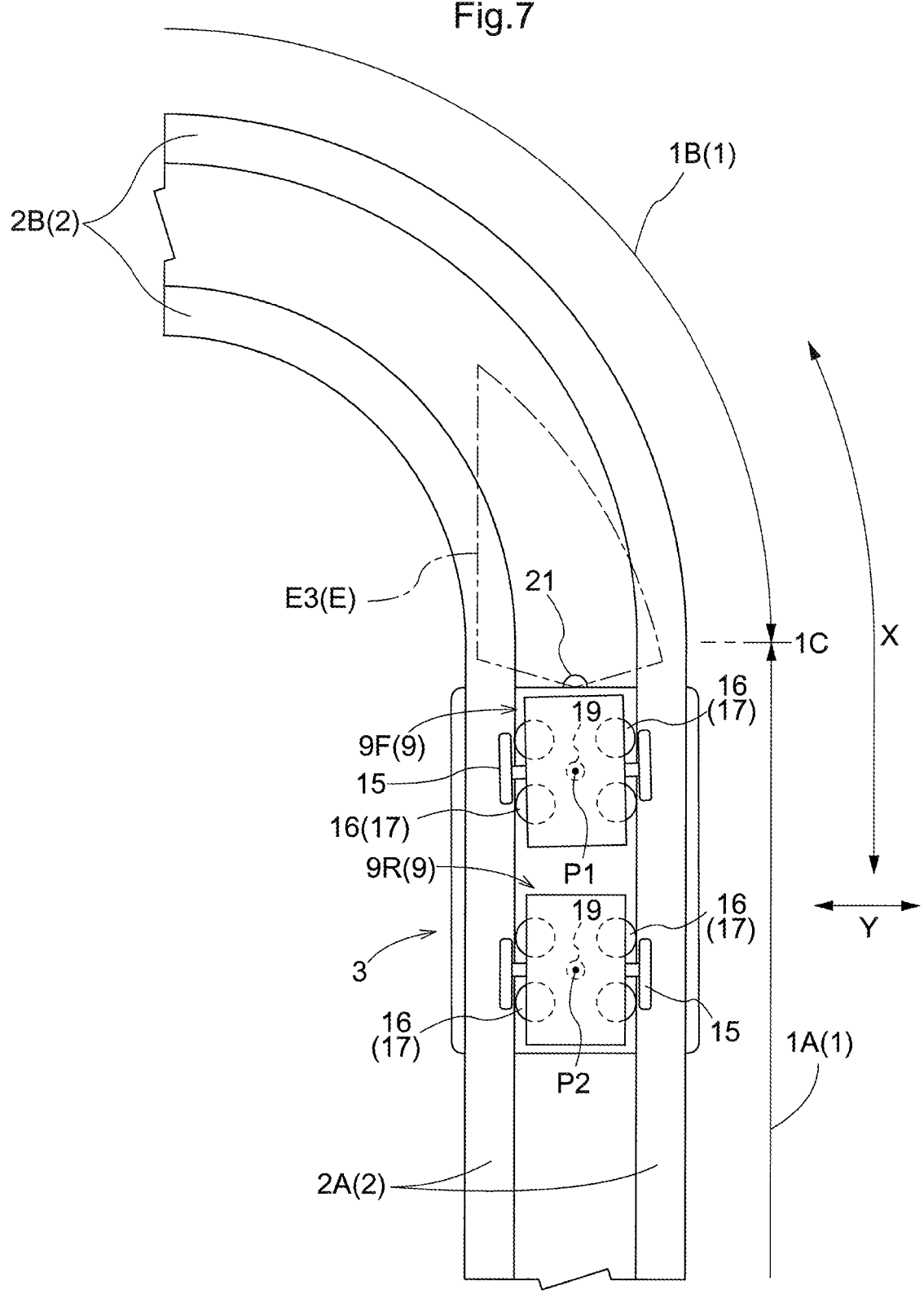
FIG. 7 shows a detection area having a third shape.
Figure 8:
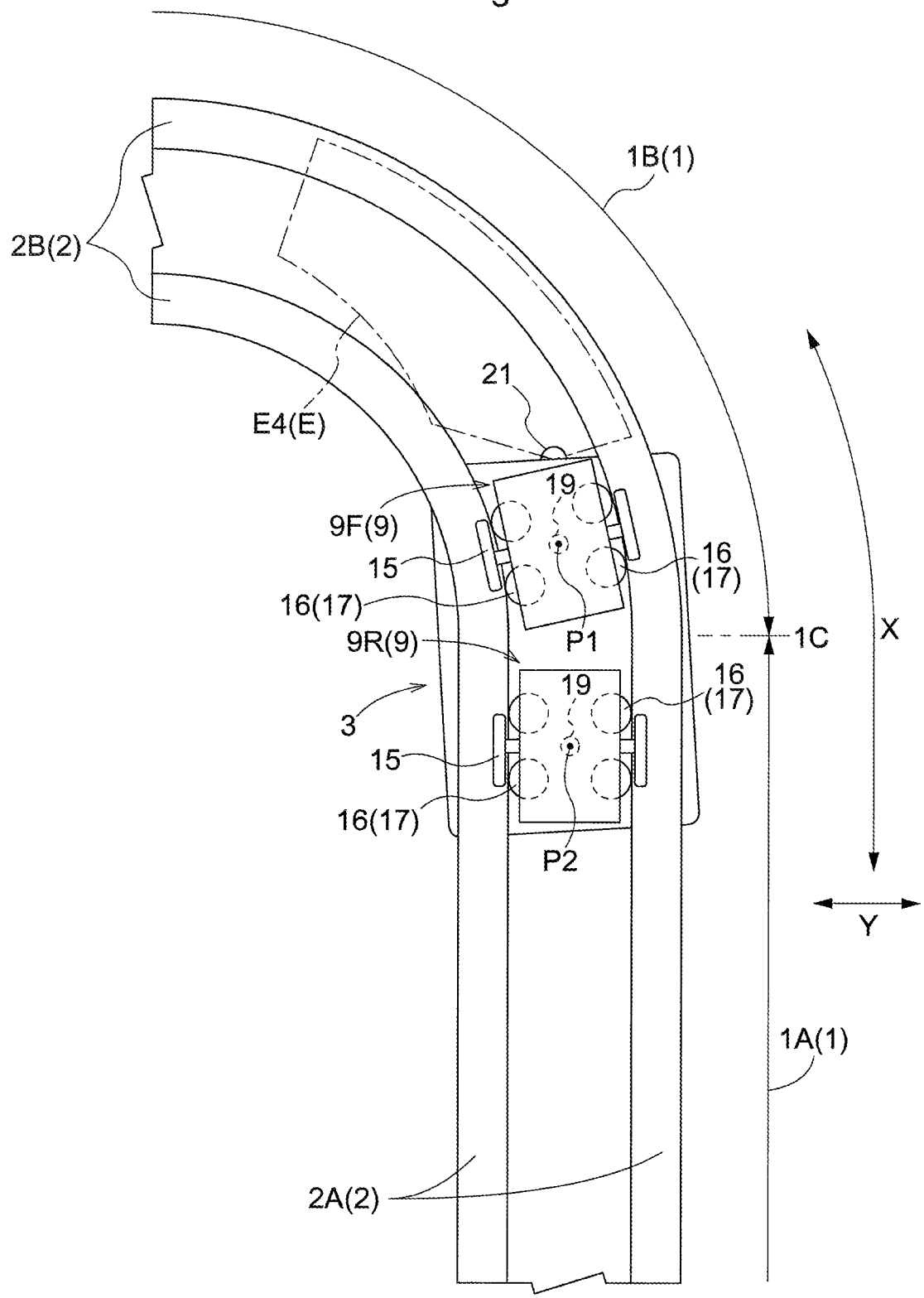
FIG. 8 shows a detection area having a fourth shape.
Figure 9:
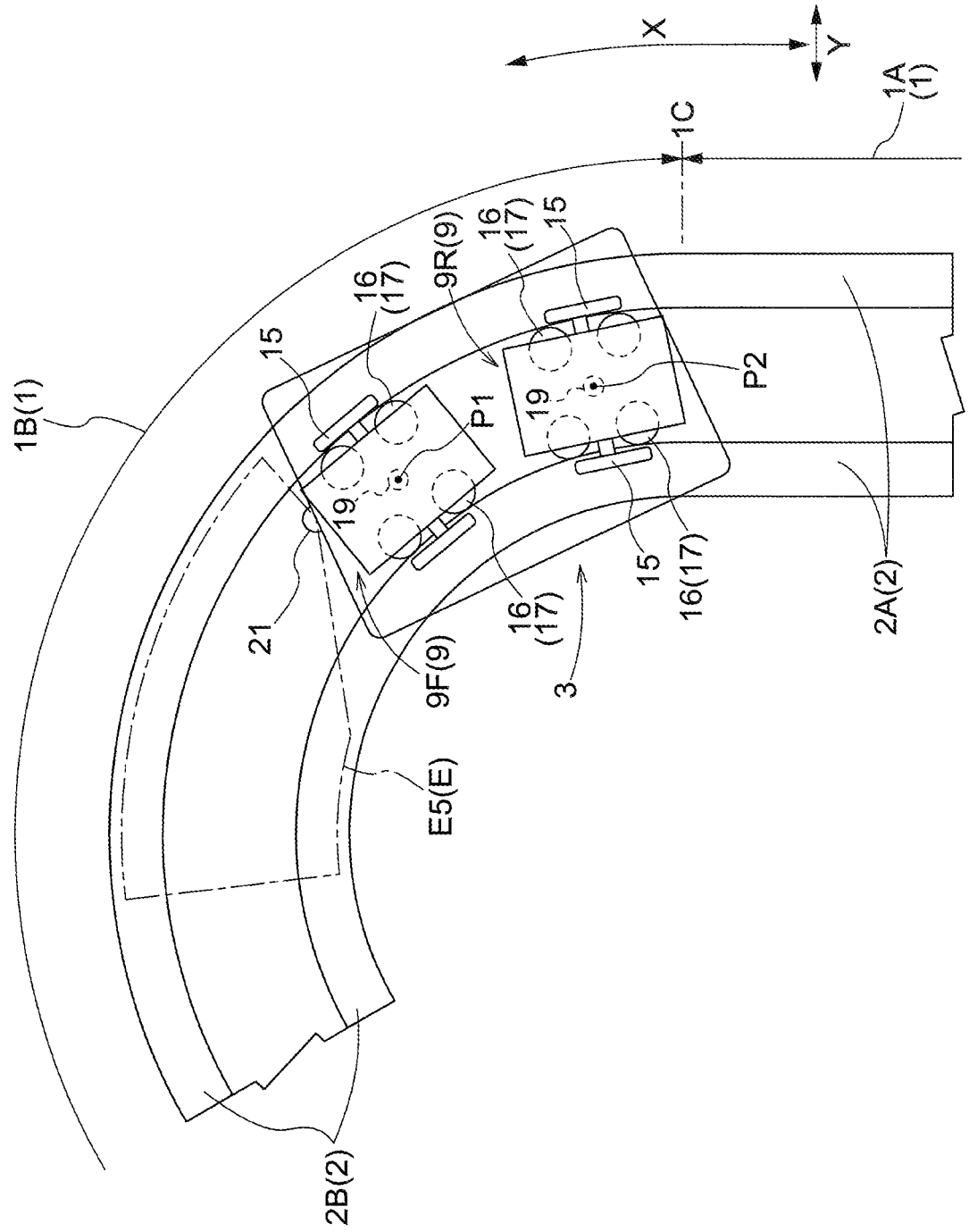
FIG. 9 shows a detection area having a fifth shape.
Figure 10:
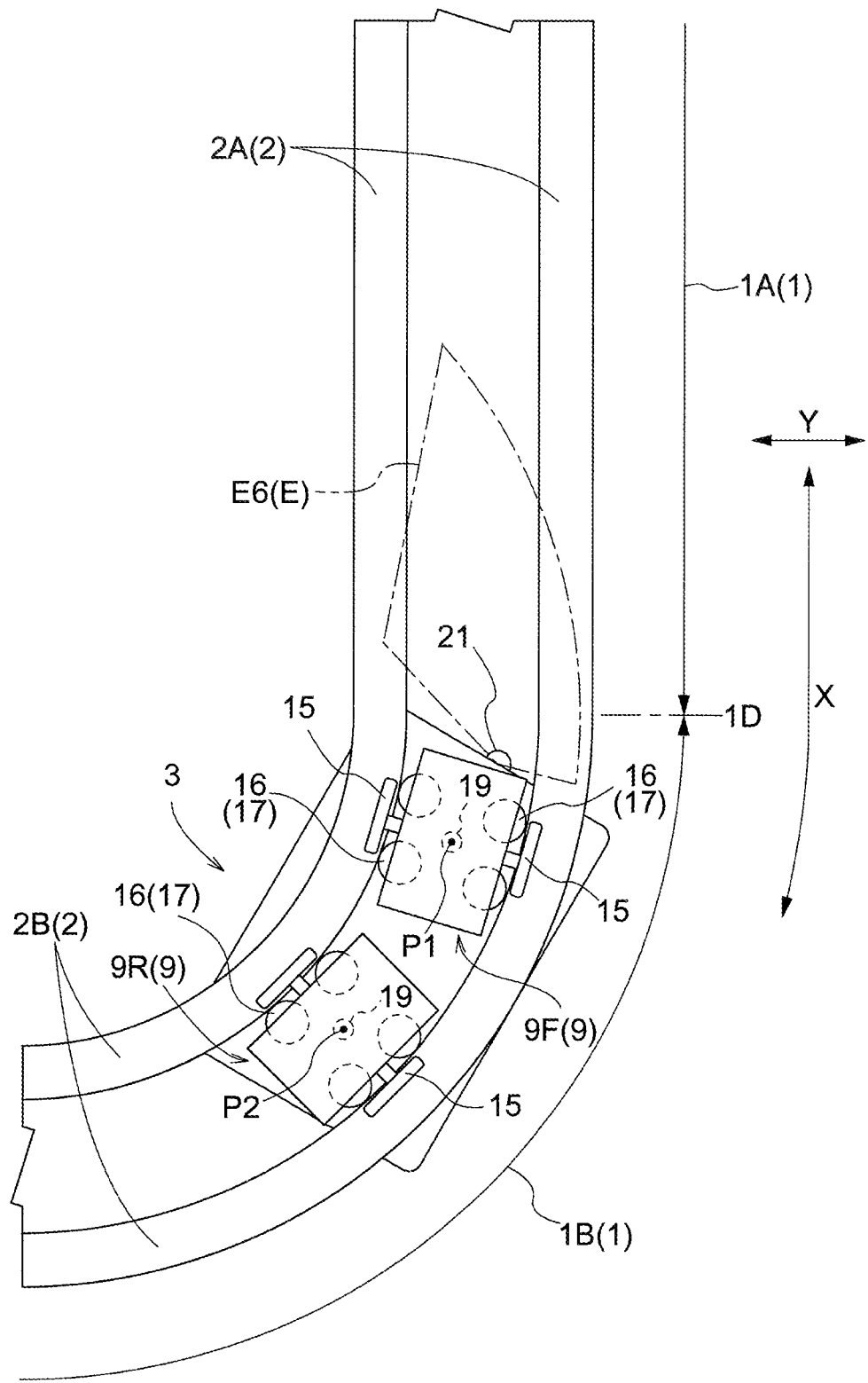
FIG. 10 shows a detection area having a sixth shape.
Figure 11:
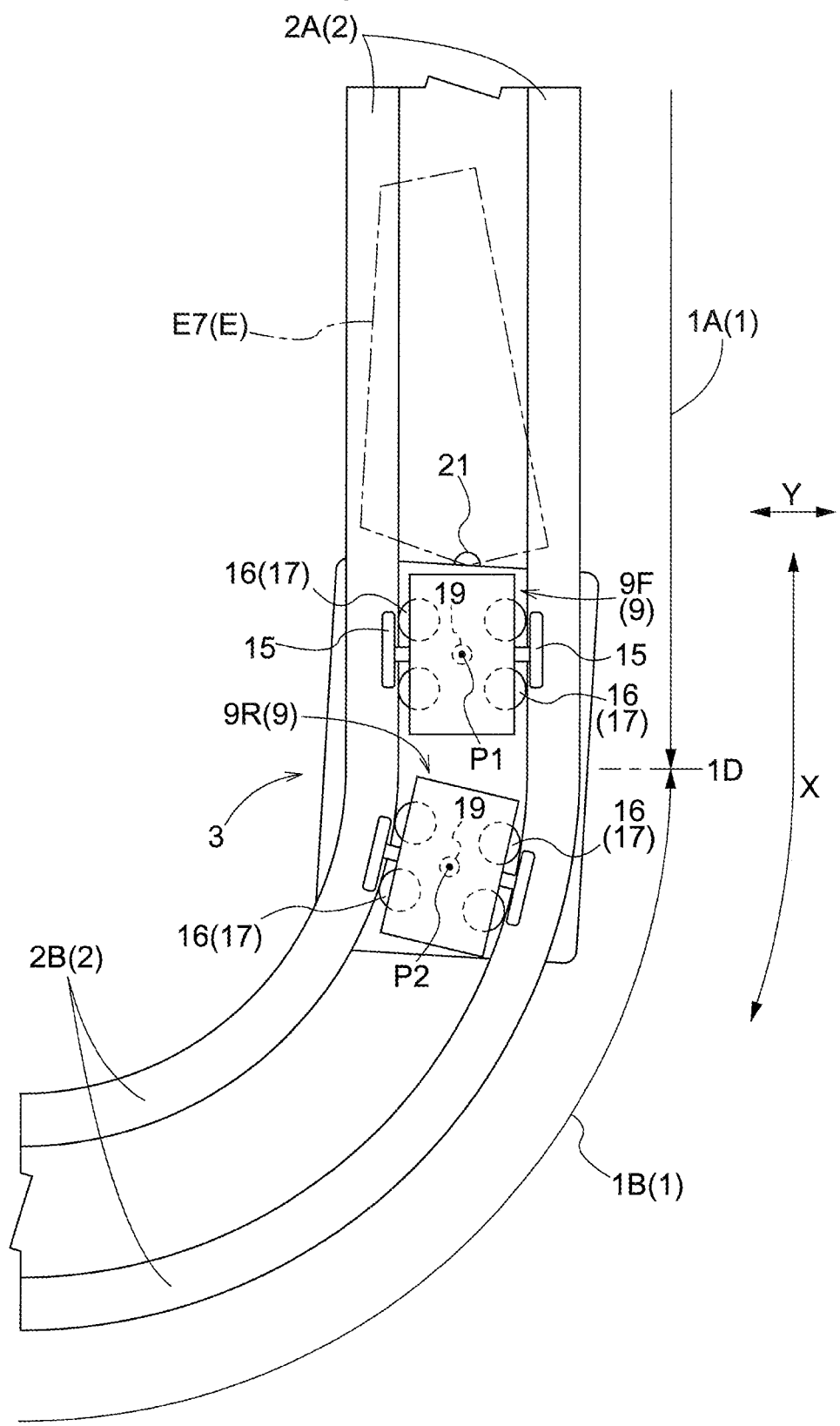
FIG. 11 shows a detection area having a seventh shape.
Figure 12:
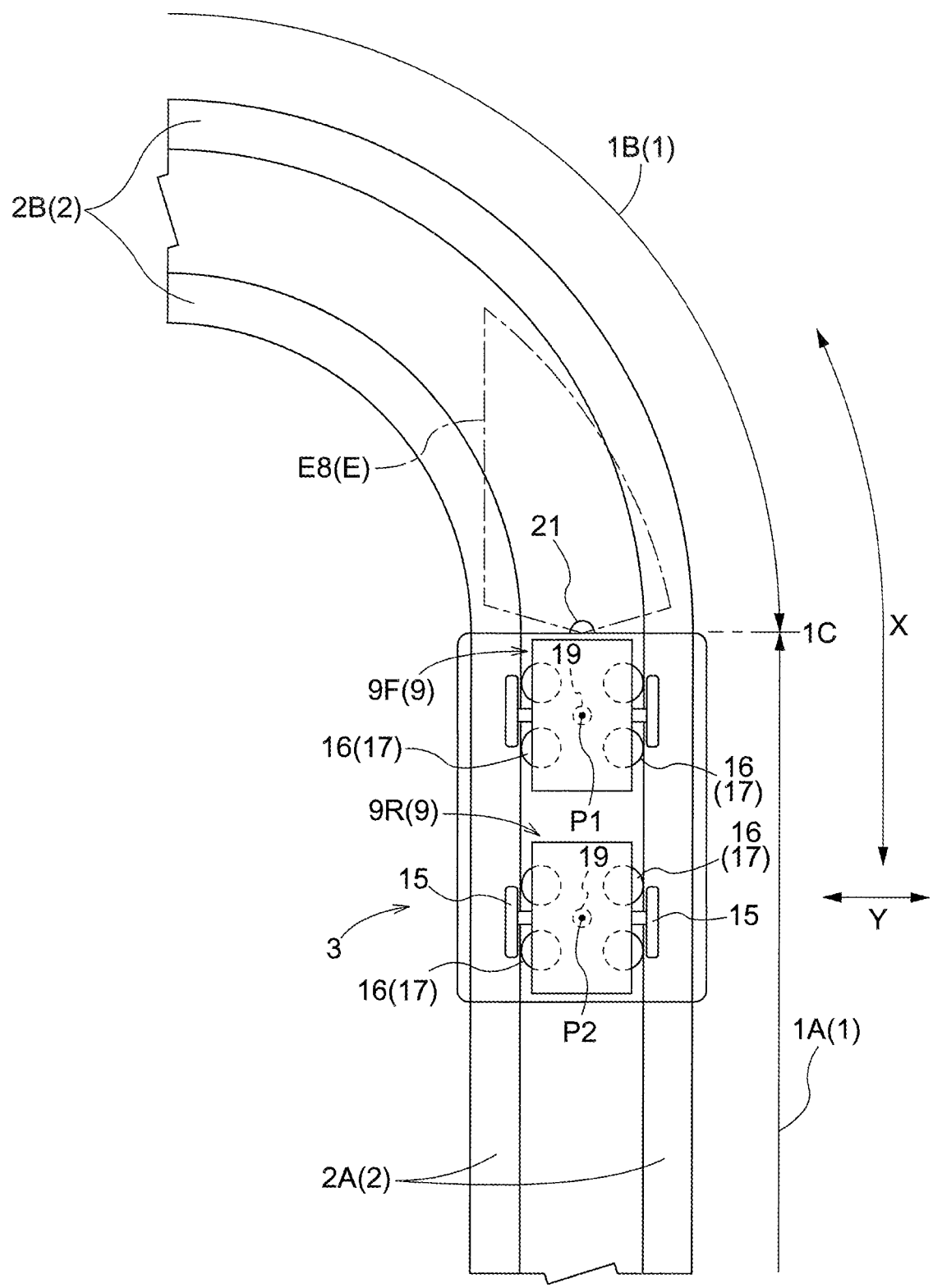
FIG. 12 shows a detection area having a eighth shape.
Figure 13:
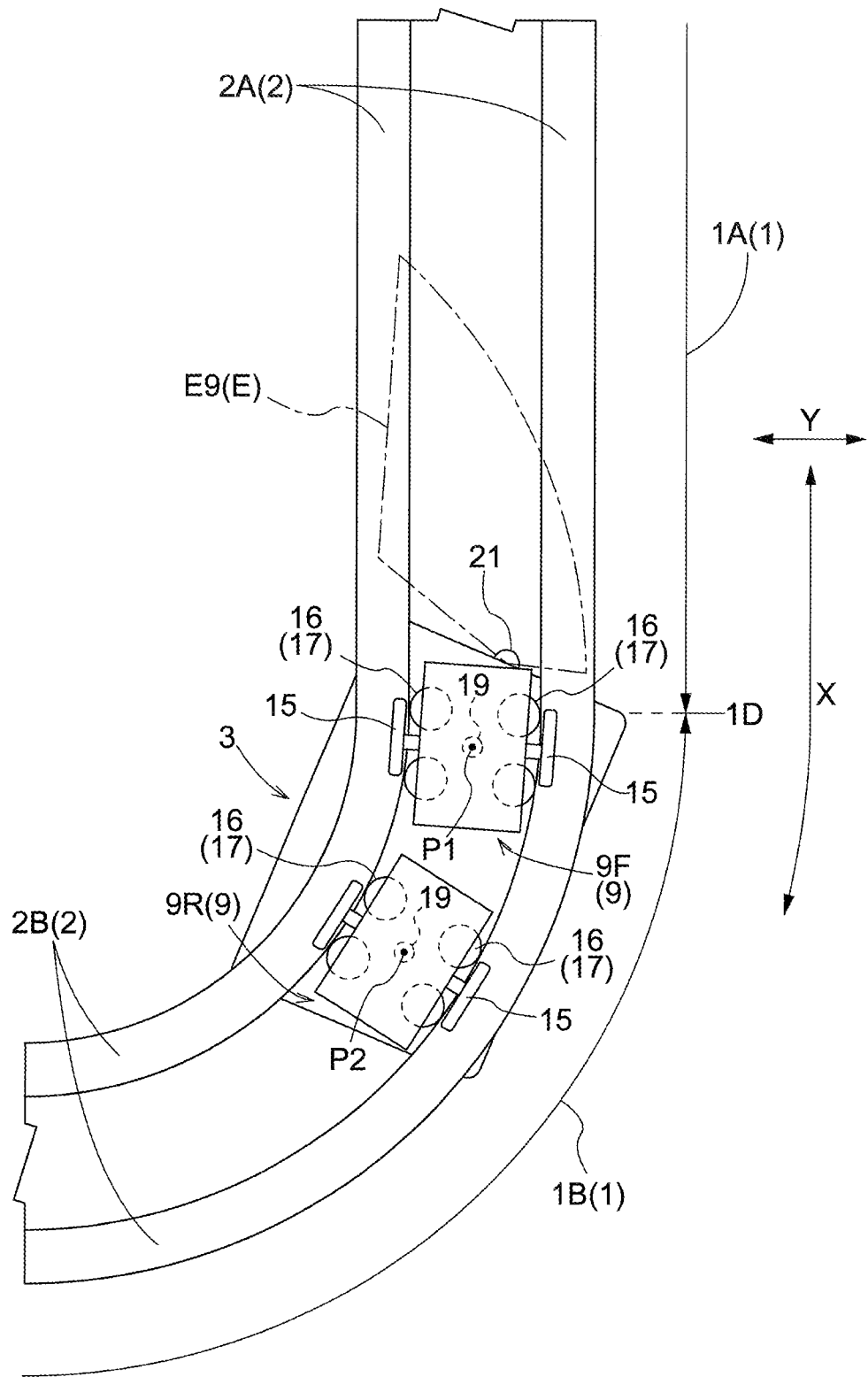
FIG. 13 shows a detection area having a ninth shape.

As shown in FIG. 7, the controller H changes the shape of the detection area E to the third shape E3 if the in-contact-rail shape is linear and the detection-area-rail shape is a combination of a linear shape and a curved shape. As shown in FIG. 8, the controller H changes the shape of the detection area E to the fourth shape E4 if the in-contact-rail shape is a combination of a linear shape and a curved shape and the detection-area-rail shape is curved. As shown in FIG. 9, the controller changes the shape of the detection area E to the fifth shape E5 if the in-contact-rail shape and the detection-area-rail shape are curved. As shown in FIG. 10, the controller H changes the shape of the detection area E to the sixth shape E6 if the in-contact-rail shape is curved and the detection-area-rail shape is a combination of a linear shape and a curved shape. As shown in FIG. 11, the controller H changes the shape of the detection area E to the seventh shape E7 if the in-contact-rail shape is a combination of a linear shape and a curved shape and the detection-area-rail shape is linear.

More specifically, as shown in FIG. 5, if the article transport vehicle 3 is traveling along a linear path portion 1A of a travel path 1 at the first speed and the in-contact-rail shape and the detection-area-rail shape are linear, then the shape of the detection area E is set to be the first shape E1.

And the shape of the detection area E is changed from the first shape E1 to the second shape E2 if the article transport vehicle 3 has reached a deceleration location and the in-contact-rail shape and the detection-area-rail shape are linear, as shown in FIG. 6, so that the article transport vehicle 3 is traveling along the linear path portion 1A of a travel path 1 at the second speed.

And the shape of the detection area E is changed from the second shape E2 to the third shape E3 if the forward end of the detection area E of the second shape E2 has reached the first connection location 1C and the in-contact-rail shape is linear and the detection-area-rail shape is a combination of a linear shape and a curved shape, as shown in FIG. 7.

And the shape of the detection area E is changed from the third shape E3 to the fourth shape E4 if the first vertical axis P1 has reached the first connection location 1C and the in-contact-rail shape is a combination of a linear shape and a curved shape and the detection-area-rail shape is curved as shown in FIG. 8.

And the shape of the detection area E is changed from the fourth shape E4 to the fifth shape E5 if the second vertical axis P2 has reached the first connection location 1C and the in-contact-rail shape and the detection-area-rail shape are curved as shown in FIG. 9.

And the shape of the detection area E is changed from the fifth shape E5 to the sixth shape E6 if the forward end of the detection area E of the fifth shape E5 has reached the second connection location 1D and the in-contact-rail shape is curved and the detection-area-rail shape is a combination of a linear shape and a curved shape as shown in FIG. 10.

And the shape of the detection area E is changed from the sixth shape E6 to the seventh shape E7 if the first vertical axis P1 has reached the second connection location 1D and the in-contact-rail shape is a combination of a linear shape and a curved shape and the detection-area-rail shape is linear as shown in FIG. 11.

And the shape of the detection area E is changed from the seventh shape E7 to the first shape E1 as shown in FIG. 5 if the second vertical axis P2 has reached the second connection location 1D and the in-contact-rail shape and the detection-area-rail shape are linear.

As such, the controller H sets a detection area E of a different shape for each of: when ("when" used in the sense of "in the event that") the in-contact-rail shape and the detection-area-rail shape are linear, when the in-contact-rail shape is linear shape and the detection-area-rail shape is a combination of a linear shape and a curved shape, when the in-contact-rail shape is a combination of a linear shape and a curved shape and the detection-area-rail shape is curved, when the in-contact-rail shape and the detection-area-rail shape are curved, when the in-contact-rail shape is curved and the detection-area-rail shape is a combination of a linear shape and a curved shape, and when the in-contact-rail shape is a combination of a linear shape and a curved shape and the detection-area-rail shape is linear.

And, examples are described with reference to FIGS. 7 through 11 in which the detection area E is changed to one of the third shape E3 through the seventh shape E7 for one curved portion that curves to the left with respect to the travel direction of the article transport vehicle 3. However, for a curved portion that curves to the right with the same radius of curvature, different shapes each having a shape that is a reflection about a line of the corresponding one of the third shape E3 through the seventh E7 shape are set or defined, and the shape of the detection area E is changed to one of these different shapes in a manner identical to one for the curved portion that curves to the left with respect to the travel direction of the article transport vehicle 3. In addition, for any curved path portion 1B whose radius of curvature is different from that of the curved path portion 1B shown in FIGS. 7 through 11, the third shape E3 through the seventh shape E7 are set or defined based on, or in accordance with, its radius of curvature.

Other embodiments of an article transport facility are described next.

(1) In the embodiment described above, the shape of the detection area E is identical (see FIG. 6) for both when ("when" used in the sense of "in the event that") the in-contact-rail shape is linear and the detection-area-rail shape is a combination of a linear shape and a curved shape and when the in-contact-rail shape is linear and the detection-area-rail shape is curved. However, the detection area E may be changed to an eighth shape E8 shown in FIG. 12 when the in-contact-rail shape is linear and the detection-area-rail shape is curved so that the shape of the detection area E for when the in-contact-rail shape is linear and the detection-area-rail shape is a combination of a linear shape and a curved shape is different from the shape for when the in-contact-rail shape is linear and the detection-area-rail shape is curved. In addition, in the embodiment described above, the shape of the detection area E is identical for both when the in-contact-rail shape is curved and the detection-area-rail shape is a combination of a linear shape and a curved shape and when the in-contact-rail shape is curved and the detection-area-rail shape is linear. However, the detection area E may be changed to a ninth shape E9 shown in FIG. 13 when the in-contact-rail shape is curved and the detection-area-rail shape is linear so that the shape of the detection area E for when the in-contact-rail shape is curved and the detection-area-rail shape is a combination of a linear shape and a curved shape is different from the shape for when the in-contact-rail shape is curved and the detection-area-rail shape is linear.

(2) In the embodiment (1) of other embodiments described above, the shape of the detection area E is different for each of: when ("when" used in the sense of "in the event that") the in-contact-rail shape and the detection-area-rail shape are linear, when the in-contact-rail shape is linear and the detection-area-rail shape is a combination of a linear shape and a curved shape, when the in-contact-rail shape is linear and the detection-area-rail shape is curved, when the in-contact-rail shape is a combination of a linear shape and a curved shape and the detection-area-rail shape is curved, when the in-contact-rail shape and the detection-area-rail shape are curved, when the in-contact-rail shape is curved and the detection-area-rail shape is a combination of a linear shape and a curved shape, when the in-contact-rail shape is curved and the detection-area-rail shape is linear, and when the in-contact-rail shape is a combination of a linear shape and a curved shape and the detection-area-rail shape is linear, with the shape for one situation being different for any other situation. However, the shapes of the detection area E may be mutually different only for, or between, two or more of the situations listed above.

(3) In the embodiment described above, the controller H is configured to change the detection area E of the obstacle detection sensor 21 based on the detected information or output from the travel distance sensor 22. However, a detected member may be placed at a location (along each travel path 1) that corresponds to each location at which the detection area E of the obstacle detection sensor 21 is to be changed. And each article transport vehicle 3 may be provided with a detecting member or sensor capable of detecting each detected member. And the controller H may be configured to change the detection area E of the obstacle detection sensor 21 based on the detected information or output from the detecting member. Also, the controller H may be configured to change the detection area E of the obstacle detection sensor 21 based on both the detected information or output from the travel distance sensor 22 and the detected information or output from the detecting member.

(4) In the embodiment described above, the detection area E of the obstacle detection sensor 21 is changed by the setting portion H1 depending on the in-contact-rail shape and the detection-area-rail shape. However, the detection area E of the obstacle detection sensor 21 may be changed by the setting portion H1 depending only on the in-contact-rail shape.

(5) In the embodiment described above, the detection area E of the obstacle detection sensor 21 is set such that the detection area E does not extend beyond the width (i.e., area delineated by an outside edge of one of the rails and an outside edge of the other of the rails) of the travel rails 2 along the path width direction Y. However, the detection area E of the obstacle detection sensor 21 may be set such that the detection area E extends beyond the travel rails 2 along the path width direction Y but does not extend beyond the width of the trajectory of the main body portion 10 of the article transport vehicle 3 along the path width direction Y.

(6) In the embodiment described above, the portions of the travel rails 2 in the same location, along the path longitudinal direction X, as the first vertical axis P1 as well as the portions of the travel rails 2 in the same location, along the path longitudinal direction X, as the second vertical axis P2 are the portions of the travel rails 2 that are in contact with the guided portion 17. The portions (of the travel rails 2) that the wheels of the two pairs of guide wheels 16 of the first travel portion 9F and the wheels of the two pairs of guide wheels 16 of the second travel portion 9R are in actual contact with may be considered to be the portions of the travel rails 2 that are in contact with the guided portion 17.

(7) In the embodiment described above, the detection area E is set depending on the travel speed of the article transport vehicle 3 such that the detection distance ahead of the article transport vehicle 3 is increased in a stepwise manner as the travel speed is increased. However, the detection area E may be set depending on the travel speed of the article transport vehicle 3 such that the detection distance ahead of the article transport vehicle 3 is increased in a continuous manner as the travel speed is increased.

(8) In the embodiment described above, the guided portion 17 is in contact with the travel rails 2 on which the travel wheels 15 roll so that the travel rails 2 are the rails that guide the guided portion 17. However, one or more guide rails may be installed or formed in addition to the travel rails 2. And the one or more guide rails may be the rail of rails that guide the guided portion 17.

(9) In addition, an arrangement disclosed in any of the embodiments described above can also be used in combination with any arrangement disclosed in any other embodiment unless inconsistency arises. Regarding any other arrangements and features, the embodiments disclosed in the present description are provided for the purposes of illustration only regarding all aspects. Therefore, it is possible to make various suitable changes without departing from the spirit of the present disclosure.

A brief summary of the article transport facility described above is provided next.

An article transport facility comprises: one or more rails which include one or more portions in which a travel path is curved; and an article transport vehicle configured to travel along the one or more rails to transport an article; wherein the article transport vehicle includes a guided portion configured to be in contact with the one or more rails to be guided thereby, an obstacle detection sensor configured to detect an obstacle in an detection area which is set to be located ahead of the article transport vehicle, and a setting portion configured to changeably set the detection area, and wherein the setting portion is configured to change the detection area depending on an in-contact-rail shape which is a shape of one or more portions of the one or more rails that the guided portion is in contact with.

With the arrangement described above, the detection area of the obstacle detection sensor is changed by the setting portion depending on to the in-contact-rail shape which the guided portion of the article transport vehicle is in contact with. In other words, although the orientation of the article transport vehicle may change because of the in-contact-rail shape which the guided portion of the article transport vehicle is in contact with, the detection area can be changed to have a shape that is appropriate for the orientation of the article transport vehicle, by changing the detection area depending on the in-contact-rail shape. This makes it possible to set the detection area of the obstacle detection sensor so that the detection area would not be shifted off the travel path along the path width direction. This arrangement makes it possible to reduce the likelihood of erroneously detecting any object outside the travel path as an obstacle. Therefore, there is no need to attach low-or-non-reflective sheet on any installed object, reducing the amount of work necessary to install the article transport facility.

Here, the one or more rails further preferably includes one or more portions in which the travel path is linear, wherein the guided portion is preferably configured to be in contact with the one or more rails in at least two locations that are spaced apart from each other along a direction parallel to the travel path, and wherein the setting portion is preferably configured to set a different shape for the detection area for each of: when the in-contact-rail shape of each of the at least two locations is linear; when the in-contact-rail shape of each of the at least two locations is curved; and when the in-contact-rail shape of the at least two locations is a combination of a linear shape and a curved shape.

With this arrangement, although the orientation of the detection area set ahead of the article transport vehicle with respect to the one or more rails would have changed depending on whether the in-contact-rail shape is linear, curved, or a combination of a linear shape and a curved shape, it is made relatively easy to set the detection area of the obstacle detection sensor so that the detection area would not be shifted off the travel path along the path width direction, by setting a different shape for the detection area for each of: when the in-contact-rail shape is linear; when the in-contact-rail shape is curved; and when the in-contact-rail shape is a combination of a linear shape and a curved shape.

In addition, the setting portion is preferably configured to change the detection area depending also on a detection-area-rail shape which is a shape of the one or more travel rails in the detectable area of the obstacle detection sensor.

With this arrangement, the detection area is changed depending on the detection-area-rail shape which is the shape of the one or more travel rails in the detectable area of the obstacle detection sensor as well as on the in-contact-rail shape which is the shape of one or more portions of the one or more rails that the guided portion is in contact with. Thus, the shape of the detection area of the obstacle detection sensor can be changed depending on the changes in the orientation of the article transport vehicle as well as on the shape of the one or more rails in the detection area, which is the shape of the travel path ahead of the article transport vehicle with respect to the travel direction. Thus, this makes it possible to appropriately set the detection area (of the obstacle detection sensor) having a large width along the path width direction without the detection area being shifted off the travel path along the path width direction.

In addition, the one or more rails preferably further includes one or more portions in which the travel path is linear, wherein the setting portion is preferably configured to set a different shape for the detection area for each of: when the detection-area-rail shape is linear; when the detection-area-rail shape is curved; and when the detection-area-rail shape is a combination of a linear shape and a curved shape.

With this arrangement, an appropriate shape can be set for the detection area for each of when the detection-area-rail shape is linear, when the detection-area-rail shape is curved, and when the detection-area-rail shape is a combination of a linear shape and a curved shape, by setting a different shape for the detection area for each of when the detection-area-rail shape is linear, when the detection-area-rail shape is curved, and when the detection-area-rail shape is a combination of a linear shape and a curved shape. Thus, this arrangement makes it possible to appropriately set the detection area (of the obstacle detection sensor) so that the detection area would not be shifted off the travel path along the path width direction.

In addition, the setting portion is preferably configured to set mutually different shapes for the detection area for two or more of: when the in-contact-rail shape and the detection-area-rail shape are linear; when the in-contact-rail shape is linear and the detection-area-rail shape is a combination of a linear shape and a curved shape; when the in-contact-rail shape is linear and the detection-area-rail shape is curved; when the in-contact-rail shape is a combination of a linear shape and a curved shape and the detection-area-rail shape is curved; when the in-contact-rail shape and the detection-area-rail shape are curved; when the in-contact-rail shape is curved and the detection-area-rail shape is a combination of a linear shape and a curved shape; when the in-contact-rail shape is curved and the detection-area-rail shape is linear; and when the in-contact-rail shape is a combination of a linear shape and a curved shape and the detection-area-rail shape is linear.

With this arrangement, since the detection area of the obstacle detection sensor can be changed depending on the combination of the in-contact-rail shape and the detection-area-rail shape, the shape of detection area can be properly set depending on changes in the orientation of the article transport vehicle and on the shape of the one or more rails in the detection area, etc.

In addition, the setting portion is preferably further configured to set the detection area depending on a travel speed of the article transport vehicle such that the detection distance ahead of the article transport vehicle is increased in a stepwise or continuous manner as the travel speed is increased.

With this arrangement, because the detection distance ahead of the article transport vehicle is increased in a stepwise or continuous manner as the travel speed is increased, it becomes easier to stop the transport vehicle without contacting any obstacle when such obstacle is detected by the obstacle detection sensor.

What is claimed is:

1. An article transport facility comprising:
   one or more rails which include one or more portions in which a travel path is curved; and an article transport vehicle configured to travel along the one or more rails to transport an article;
wherein the article transport vehicle includes a guided portion configured to be in contact with the one or more rails to be guided thereby, an obstacle detection sensor configured to detect an obstacle in an detection area which is set to be located ahead in a travel direction of the article transport vehicle, and a setting portion configured to changeably set the detection area, and
wherein the setting portion is configured to change the detection area depending on an in-contact-rail shape which is a shape along the travel direction of one or more portions of the one or more rails that the guided portion is in contact with.

2. The article transport facility as defined in claim 1, wherein the one or more rails further includes one or more portions in which the travel path is linear,
wherein the guided portion is configured to be in contact with the one or more rails in at least two locations that are spaced apart from each other along a direction parallel to the travel path, and
wherein the setting portion is configured to set a different shape for the detection area for each of: when the in-contact-rail shape of each of the at least two locations is linear; when the in-contact-rail shape of each of the at least two locations is curved; and when the in-contact-rail shape of the at least two locations is a combination of a linear shape and a curved shape.

3. The article transport facility as defined in claim 2, wherein the setting portion is further configured to set the detection area depending on a travel speed of the article transport vehicle such that the detection distance ahead of the article transport vehicle is increased in a stepwise or continuous manner as the travel speed is increased.

4. The article transport facility as defined in claim 2, wherein the setting portion is configured to change the detection area depending also on a detection-area-rail shape which is a shape of the one or more travel rails in the detectable area of the obstacle detection sensor.

5. The article transport facility as defined in claim 4, wherein the setting portion is further configured to set the detection area depending on a travel speed of the article transport vehicle such that the detection distance ahead of the article transport vehicle is increased in a stepwise or continuous manner as the travel speed is increased.

6. The article transport facility as defined in claim 4, wherein the one or more rails further includes one or more portions in which the travel path is linear,
wherein the setting portion is configured to set a different shape for the detection area for each of: when the detection-area-rail shape is linear; when the detection-area-rail shape is curved; and when the detection-area-rail shape is a combination of a linear shape and a curved shape.

7. The article transport facility as defined in claim 6, wherein the setting portion is further configured to set the detection area depending on a travel speed of the article transport vehicle such that the detection distance ahead of the article transport vehicle is increased in a stepwise or continuous manner as the travel speed is increased.

8. The article transport facility as defined in claim 6, wherein the setting portion is configured to set mutually different shapes for the detection area for two or more of: when the in-contact-rail shape and the detection-area-rail shape are linear; when the in-contact-rail shape is linear and the detection-area-rail shape is a combination of a linear shape and a curved shape; when the in-contact-rail shape is linear and the detection-area-rail shape is curved; when the in-contact-rail shape is a combination of a linear shape and a curved shape and the detection-area-rail shape is curved; when the in-contact-rail shape and the detection-area-rail shape are curved; when the in-contact-rail shape is curved and the detection-area-rail shape is a combination of a linear shape and a curved shape; when the in-contact-rail shape is curved and the detection-area-rail shape is linear; and when the in-contact-rail shape is a combination of a linear shape and a curved shape and the detection-area-rail shape is linear.

9. The article transport facility as defined in claim 8, wherein the setting portion is further configured to set the detection area depending on a travel speed of the article transport vehicle such that the detection distance ahead of the article transport vehicle is increased in a stepwise or continuous manner as the travel speed is increased.

10. The article transport facility as defined in claim 1, wherein the setting portion is configured to change the detection area depending also on a detection-area-rail shape which is a shape of the one or more travel rails in the detectable area of the obstacle detection sensor.

11. The article transport facility as defined in claim 10, wherein the one or more rails further includes one or more portions in which the travel path is linear,
wherein the setting portion is configured to set a different shape for the detection area for each of: when the detection-area-rail shape is linear; when the detection-area-rail shape is curved; and when the detection-area-rail shape is a combination of a linear shape and a curved shape.

12. The article transport facility as defined in claim 11, wherein the setting portion is further configured to set the detection area depending on a travel speed of the article transport vehicle such that the detection distance ahead of the article transport vehicle is increased in a stepwise or continuous manner as the travel speed is increased.

13. The article transport facility as defined in claim 11, wherein the setting portion is configured to set mutually different shapes for the detection area for two or more of: when the in-contact-rail shape and the detection-area-rail shape are linear; when the in-contact-rail shape is linear and the detection-area-rail shape is a combination of a linear shape and a curved shape; when the in-contact-rail shape is linear and the detection-area-rail shape is curved; when the in-contact-rail shape is a combination of a linear shape and a curved shape and the detection-area-rail shape is curved; when the in-contact-rail shape and the detection-area-rail shape are curved; when the in-contact-rail shape is curved and the detection-area-rail shape is a combination of a linear shape and a curved shape; when the in-contact-rail shape is curved and the detection-area-rail shape is linear; and when the in-contact-rail shape is a combination of a linear shape and a curved shape and the detection-area-rail shape is linear.

14. The article transport facility as defined in claim 13, wherein the setting portion is further configured to set the detection area depending on a travel speed of the article transport vehicle such that the detection distance ahead of the article transport vehicle is increased in a stepwise or continuous manner as the travel speed is increased.

15. The article transport facility as defined in claim 10, wherein the setting portion is further configured to set the detection area depending on a travel speed of the article transport vehicle such that the detection distance ahead of the article transport vehicle is increased in a stepwise or continuous manner as the travel speed is increased.

16. The article transport facility as defined in claim 1, wherein the setting portion is further configured to set the detection area depending on a travel speed of the article transport vehicle such that the detection distance ahead of the article transport vehicle is increased in a stepwise or continuous manner as the travel speed is increased.

17. The article transport facility as defined in claim 1, wherein the guided portion is a guide wheel which rolls on a side surface of the rail.

18. An article transport facility comprising:
one or more rails which include one or more portions in which a travel path is curved; and
an article transport vehicle configured to travel along the one or more rails to transport an article;
wherein the article transport vehicle includes a guided portion configured to be in contact with the one or more rails to be guided thereby, an obstacle detection sensor configured to detect an obstacle in an detection area which is set to be located ahead of the article transport vehicle, and a setting portion configured to changeably set the detection area,
wherein the setting portion is configured to change the detection area depending on an in-contact-rail shape which is a shape of one or more portions of the one or more rails that the guided portion is in contact with,
wherein the one or more rails further includes one or more portions in which the travel path is linear,
wherein the guided portion is configured to be in contact with the one or more rails in at least two locations that are spaced apart from each other along a direction parallel to the travel path, and
wherein the setting portion is configured to set a different shape for the detection area for each of: when the in-contact-rail shape of each of the at least two locations is linear; when the in-contact-rail shape of each of the at least two locations is curved; and when the in-contact-rail shape of the at least two locations is a combination of a linear shape and a curved shape.

19. An article transport facility comprising:
one or more rails which include one or more portions in which a travel path is curved; and
an article transport vehicle configured to travel along the one or more rails to transport an article;
wherein the article transport vehicle includes a guided portion configured to be in contact with the one or more rails to be guided thereby, an obstacle detection sensor configured to detect an obstacle in an detection area which is set to be located ahead of the article transport vehicle, and a setting portion configured to changeably set the detection area,
wherein the setting portion is configured to change the detection area depending on an in-contact-rail shape which is a shape of one or more portions of the one or more rails that the guided portion is in contact with, and
wherein the setting portion is configured to change the detection area depending also on a detection-area-rail shape which is a shape of the one or more travel rails in the detectable area of the obstacle detection sensor.

20. An article transport facility comprising:
one or more rails which include one or more portions in which a travel path is curved; and
an article transport vehicle configured to travel along the one or more rails to transport an article;
wherein the article transport vehicle includes a guided portion configured to be in contact with the one or more rails to be guided thereby, an obstacle detection sensor configured to detect an obstacle in an detection area which is set to be located ahead of the article transport vehicle, and a setting portion configured to changeably set the detection area,
wherein the setting portion is configured to change the detection area depending on an in-contact-rail shape which is a shape of one or more portions of the one or more rails that the guided portion is in contact with, and
wherein the setting portion is further configured to set the detection area depending on a travel speed of the article transport vehicle such that the detection distance ahead of the article transport vehicle is increased in a stepwise or continuous manner as the travel speed is increased.

* * * * *